(No Model.)
C. O. ANDERSON.
ICE VELOCIPEDE.
No. 586,412. Patented July 13, 1897.
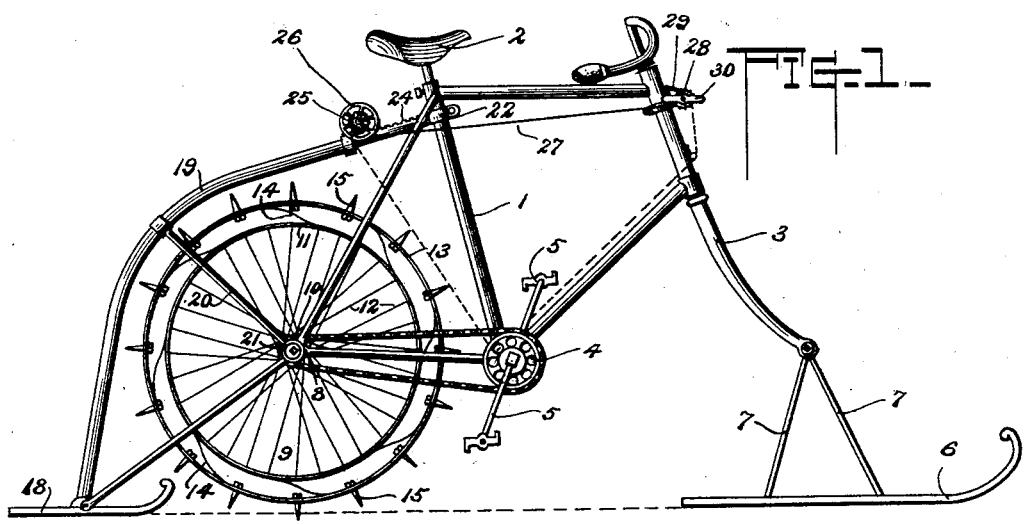
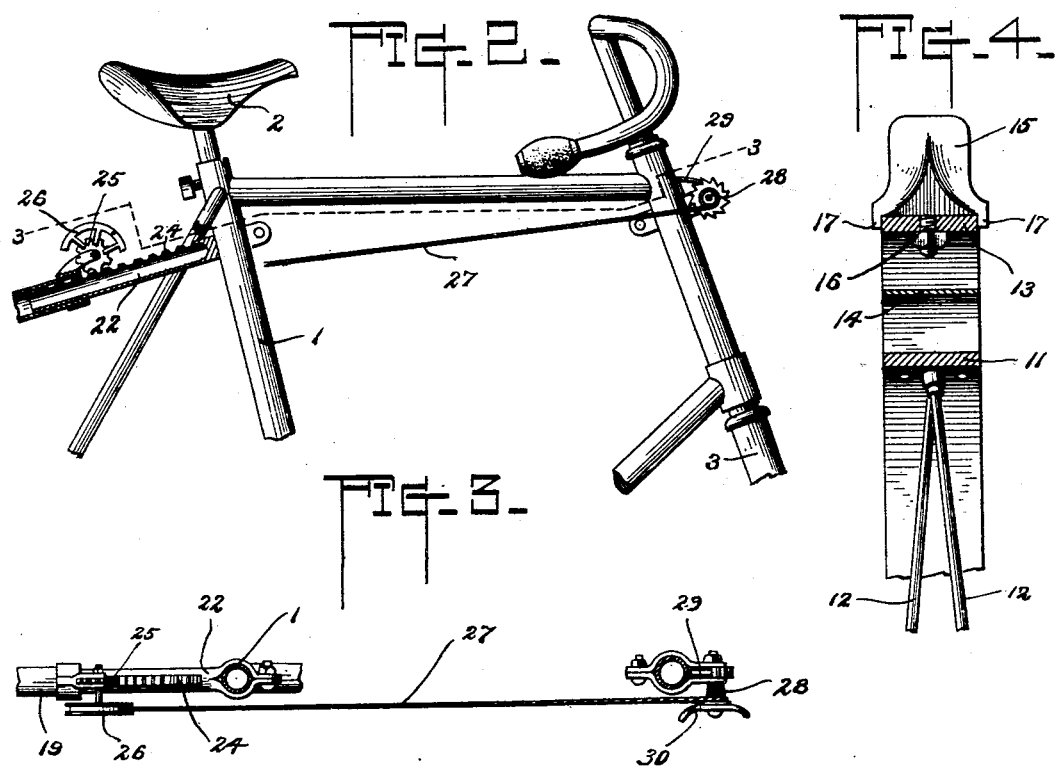
WITNESSES
A. M. Poynter
L. W. Lockbridge
INVENTOR,
Charles O. Anderson
by John Weaderburn
Attorney

UNITED STATES PATENT OFFICE.

CHARLES O. ANDERSON, OF BUTTE, MONTANA.

ICE-VELOCIPEDE.

SPECIFICATION forming part of Letters Patent No. 586,412, dated July 13, 1897.

Application filed November 2, 1896. Serial No. 610,841. (No model.)

*To all whom it may concern:*

Be it known that I, CHARLES O. ANDERSON, a citizen of the United States, residing at Butte, in the county of Silver Bow and State of Montana, have invented certain new and useful Improvements in Ice-Velocipedes; and I do hereby declare the following to be a full, clear, and exact description of the invention, such as will enable others skilled in the art to which it appertains to make and use the same.

This invention has reference to a novel construction in a velocipede adapted to be propelled over ice or snow; and it consists in the features of construction hereinafter described and claimed.

In the accompanying drawings, forming a part of this specification, Figure 1 is a side elevation of a velocipede constructed in accordance with this invention. Fig. 2 is a fragmentary vertical section of the upper portion of the frame. Fig. 3 is a horizontal section of the same, taken on an indirect line 3 3 of Fig. 2; and Fig. 4 is a transverse section of the driving-wheel.

Referring to said drawings, 1 indicates the main frame, provided with a saddle 2 and steering-fork 3. The said frame 1 is constructed similarly to the diamond-frame bicycles and is further provided with a gear-wheel 4 and pedals 5. To the lower end of the fork is pivoted a runner 6 by means of the uprights 7 upon said runner, that are pivoted to the lower end of the fork. To the lower part of the frame 1 and in the bearings 8 thereof is pivoted a propelling-wheel 9, having a gear-pinion 10, that is geared to the driving-wheel 4, above referred to. The said wheel 9 consists of an inner rim 11, connected with the hub by spokes 12 in the usual manner, and an outer rim 13, larger than said inner rim. Between these rims 11 and 13 are a plurality of springs 14, which are preferably plate-springs. By this construction it is seen that a flexible or cushioned wheel is provided—that is to say, the springs between the outer and inner rims allow these arms to move with relation to each other in the manner shown. The said outer rim 13 is provided with a plurality of sharp teeth or projections 15, that serve to engage the ice or snow, so that when the wheel is rotated the velocipede is driven. The said projections or teeth consist of small tapered metallic blocks provided with rearwardly-extending stems 16 and side lugs 17, which engage the sides of the rim 13, while the stem 16 passes through an opening in said rim and is held in place by a nut.

The said velocipede is also provided with a rear runner 18, pivoted to the rear end of an overhanging frame 19, secured to the frame 1 adjacent to the saddle and to the rear end of said frame. The said overhanging frame 19 is secured to the frame 1 adjacent to the saddle and to the rear end of said frame. This overhanging frame 19 is provided with a brace-rod 20, having eyes 21 at their inner ends, which are pivoted concentrically with the axle of the driving-wheel, as shown.

The connection between the upper end of the frame 19 and the frame of the velocipede consists of a coupling-section 22, that is rigidly secured at one end to the frame of the velocipede, while at its other end it has a sliding connection with the frame 19. The said coupling-section 22 is provided with a plurality of teeth 24, forming a rack-bar, while upon the end of the frame 19 is a rotatable gear-wheel 25 to engage said rack-bar and provided with a winding-drum 26, to which is connected a cable 27, that extends forwardly and is connected with a winding-shaft 28 upon the front portion of the frame of the velocipede that is controlled by a detent 29 and can be turned by the handle 30. It will be seen that by this adjustable rear frame of the velocipede the main portion thereof can be raised or lowered to give the projections or teeth 15 of the propelling-wheel the necessary bite to propel the machine.

A velocipede constructed in this manner is not only simple and inexpensive but can be propelled with ease and at a high speed over ice, as will be obvious. It is of course understood that in connection with ladies' bicycles the cable 27 is trained around the lower part of the frame in any convenient manner, as shown in dotted lines in Fig. 1.

Having thus described my invention, what I claim as new, and desire to secure by Letters Patent, is—

1. A velocipede consisting of a main frame having a front runner, a rearwardly-extending and overhanging frame connected with the main frame and movable with relation thereto, a rear runner upon the lower end of said overhanging frame, a propelling-wheel carried by said main frame and situated between said runner, and propelling devices.

2. A velocipede consisting of a main frame having a steering-post, a front runner pivoted to said steering-post, a rearwardly-extending and overhanging frame connected to said main frame and movable with relation thereto, a rear runner upon the lower end of said overhanging frame, a flexible propelling-wheel, and driving mechanism.

3. A velocipede consisting of a main frame having a steering-post and front runner, an adjustable rearwardly-extending and overhanging frame pivoted to the said main frame and provided with a runner at its lower end, a propelling-wheel situated between said runners, and driving mechanism.

4. In a velocipede a wheel consisting of a hub, spokes, an inner rim, an outer rim, interposed springs, and teeth or projections secured upon said outer rim and consisting of sharpened or tapered blocks having side lugs to engage the side of said outer rim, and a stem passing through an opening in said rim.

5. In a velocipede, a frame having a front runner and propelling devices, a rear frame provided with a pivoted runner and having braces pivoted to the frame of the bicycle, a coupling-section rigidly secured to the frame and having a sliding connection with said rear frame, teeth upon said coupling-section, a gear-pinion upon said frame intermeshing with said teeth and having a winding-pulley, and a winding device upon said frame having a handle and detent and connected with the winding-pulley by a cable.

In testimony whereof I have signed this specification in the presence of two subscribing witnesses.

CHARLES O. ANDERSON.

Witnesses:
   WM. H. WEED,
   ED. BALSEY.